United States Patent
Lerner et al.

[11] 3,904,080
[45] Sept. 9, 1975

[54] LIQUID DISPENSER

[76] Inventors: Edward Lerner, 3 Marshall St., Irvington, N.J. 07111; John A. Ventura, 32 Jefferson St., Nutley, N.J. 07110

[22] Filed: Jan. 19, 1973

[21] Appl. No.: 325,202

[52] U.S. Cl. .............. 222/23; 222/131; 222/183; 251/139
[51] Int. Cl. ............................................ B67d 5/08
[58] Field of Search .............. 222/131, 133, 146 H, 222/146 HE, 181, 183, 481, 504, 23, 222/41; 251/65, 139, 141

[56] References Cited
UNITED STATES PATENTS

| | | | |
|---|---|---|---|
| 2,700,395 | 1/1955 | Young | 251/65 X |
| 2,841,311 | 7/1958 | Parizek | 222/181 |
| 2,962,593 | 11/1960 | Thomas | 251/65 X |
| 3,273,752 | 9/1966 | Horeczky | 251/141 X |
| 3,285,474 | 11/1966 | Gray | 222/183 X |
| 3,342,384 | 9/1967 | Jacobs | 251/139 X |

Primary Examiner—Allen N. Knowles
Assistant Examiner—Larry H. Martin
Attorney, Agent, or Firm—Bain, Gilfillan & Rhodes

[57] ABSTRACT

A liquid dispenser with horizontally spearable, unitized liquid reservoir and valve assembly comprising a hollow housing preferably either open at the front or having a detachable front panel, a liquid reservoir mounted in the housing, the reservoir preferably being opened at the top and being suspended from a bracket mounted to the housing at the top, the bracket being open at the front, a conduit depending from and communicating with the bottom of the reservoir, magnetically operable valve means in the conduit, magnetic generating means in the housing positioned in operable relationship to the valve means external to and mechanically unconnected with the conduit, the said magnetic means preferably being generally U-shaped but at least providing an opening facing the front of the housing for intrusion and withdrawal of the conduit, the reservoir and conduit being detachable from the housing by movement in a horizontal plane preferably in the direction of the front of the housing.

5 Claims, 5 Drawing Figures

PATENTED SEP 9 1975

LIQUID DISPENSER

BACKGROUND OF THE INVENTION

In the pre-brewed coffee dispensing arts such as the coin-operated coffee dispensing arts, pre-brewed coffee is placed in a reservoir mounted in a convenient housing. In many installations, particularly the coin-operated type, electrically operated valve means must be employed in a conduit connected to the bottom of the reservoir for the dispensing of measured quantities of coffee. The more complex electrically operated valves are far too costly. Therefore, many coin-operated dispensers employ solenoid or magnetically operable valves.

In the common coin-operated coffee dispenser, employing a magnetically operated solenoid-type valve, the coils are mechanically connected to the conduit which is in turn connected to the bottom of the reservoir, the reservoir, conduit, valve and coils being a unitary element.

In order to clean the reservoir, conduit and valve elements, care must be taken not to subject electrical elements to cleansing solutions, particularly solenoid coils which are easily damaged thereby. As a result, in the well-known coin-operated coffee dispensing apparatus, cleansing of the reservoir and/or the valve assembly is extremely difficult either requiring complex disassembly of electrical elements or the careful avoidance of submersion of such elements.

Additionally, in the well-known coin-operated coffee dispenser, access to the reservoir for removal from the housing is from the top of the housing. As a consequence, excessive head room must be provided for removal of the reservoir or in the alternative, the entire housing must be removed from its established location to achieve access to the top. This is extremely inconvenient.

It is among the objects of the present invention and among its advantages to provide a liquid dispenser in which the reservoir and the dispensing conduit are a unitized assembly and the conduit carries a magnetically operable valve which is mechanically unconnected to coil means mounted in the housing thereby obviating altogether the necessity for complex mechanical disassembly of electrical components from the reservoir, conduit and valve for cleaning purposes.

Another object of the present invention is to provide a liquid dispenser of the character aforesaid which is detachable from a housing by movement in a horizontal plane, access to the reservoir and conduit being achieved through a detachable front panel on the housing.

SUMMARY OF THE INVENTION

A liquid dispenser with horizontally separable, unitized liquid reservoir and valve assembly comprising a reservoir, a conduit depending from and communicating with the bottom of the reservoir, magnetically operable valve means in the conduit, magnetic generating means positioned in operable relationship to said valve means external to and mechanically unconnected with said conduit, the reservoir and conduit being detachable from the magnetic generating means by movement in a horizontal plane.

PREFERRED EMBODIMENT OF INVENTION

The objects and advantages aforesaid as well as other objects and advantages may be achieved by the liquid dispenser claimed herein, a preferred embodiment of which is illustrated in the drawings in which:

Figure 1:
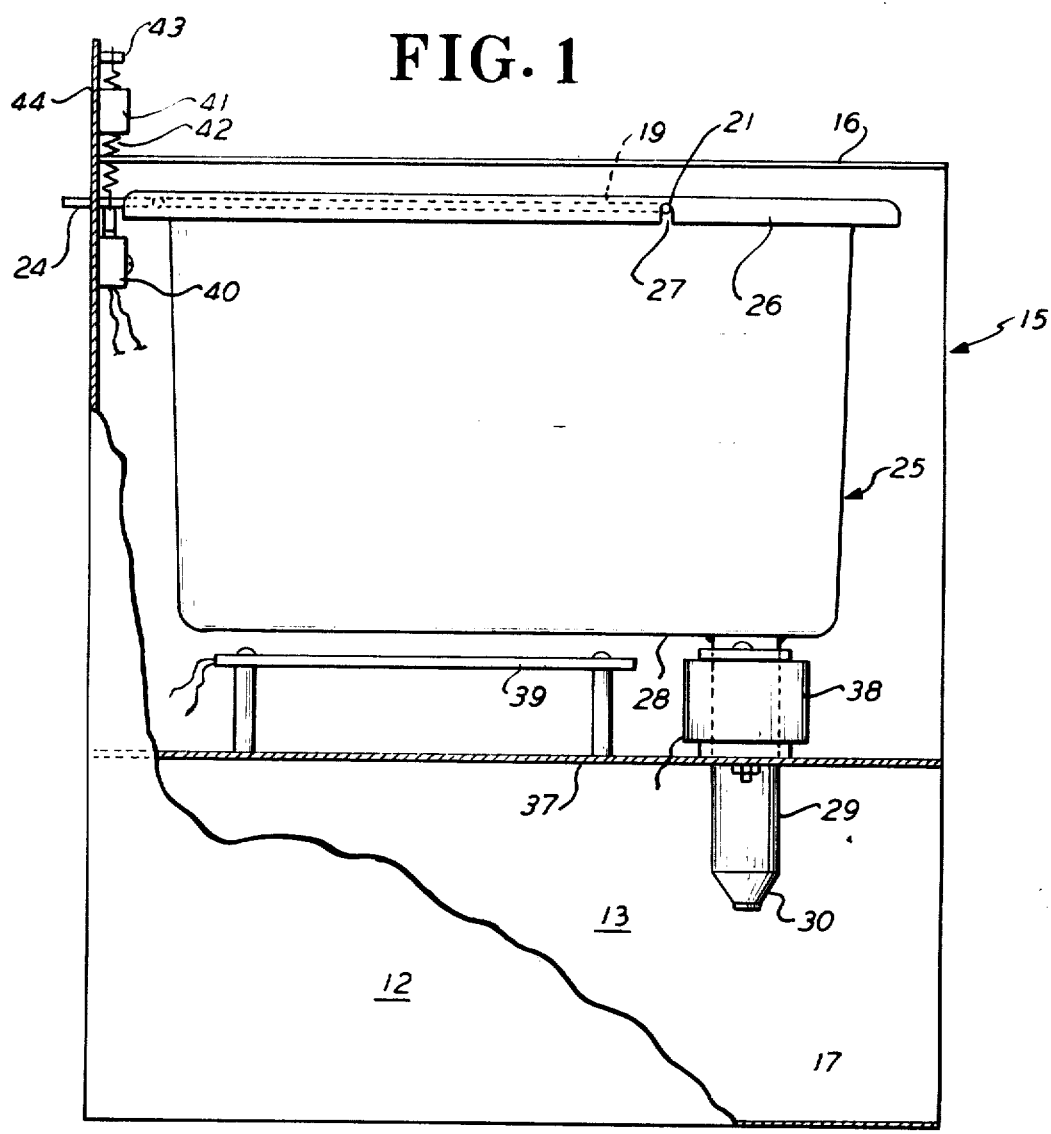
FIG. 1 is a side elevational view of the liquid dispenser with a portion of the side wall of the housing broken away.

Referring now to the drawings in detail, the liquid dispenser comprises a housing 11. The housing 11 is a generally upstanding rectangular configuration being defined by upstanding, spaced apart side walls 12 and 13, a rear wall 14 and a front panel 15. The housing 11 is also provided with a top 16 and preferably a bottom 17.

Figure 5:
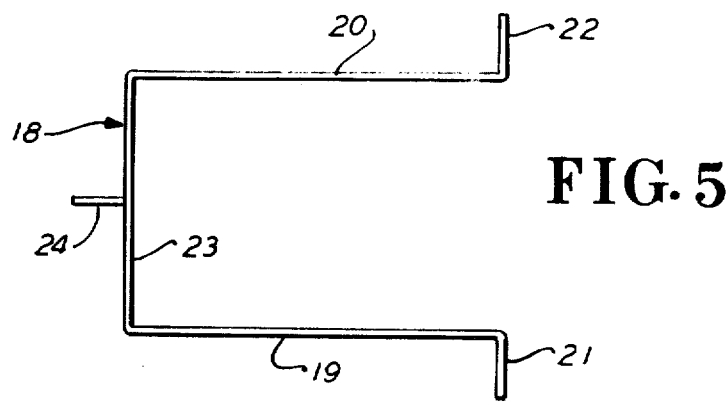
FIG. 5 is a top plan view of a reservoir mounting bracket.
Figure 2:
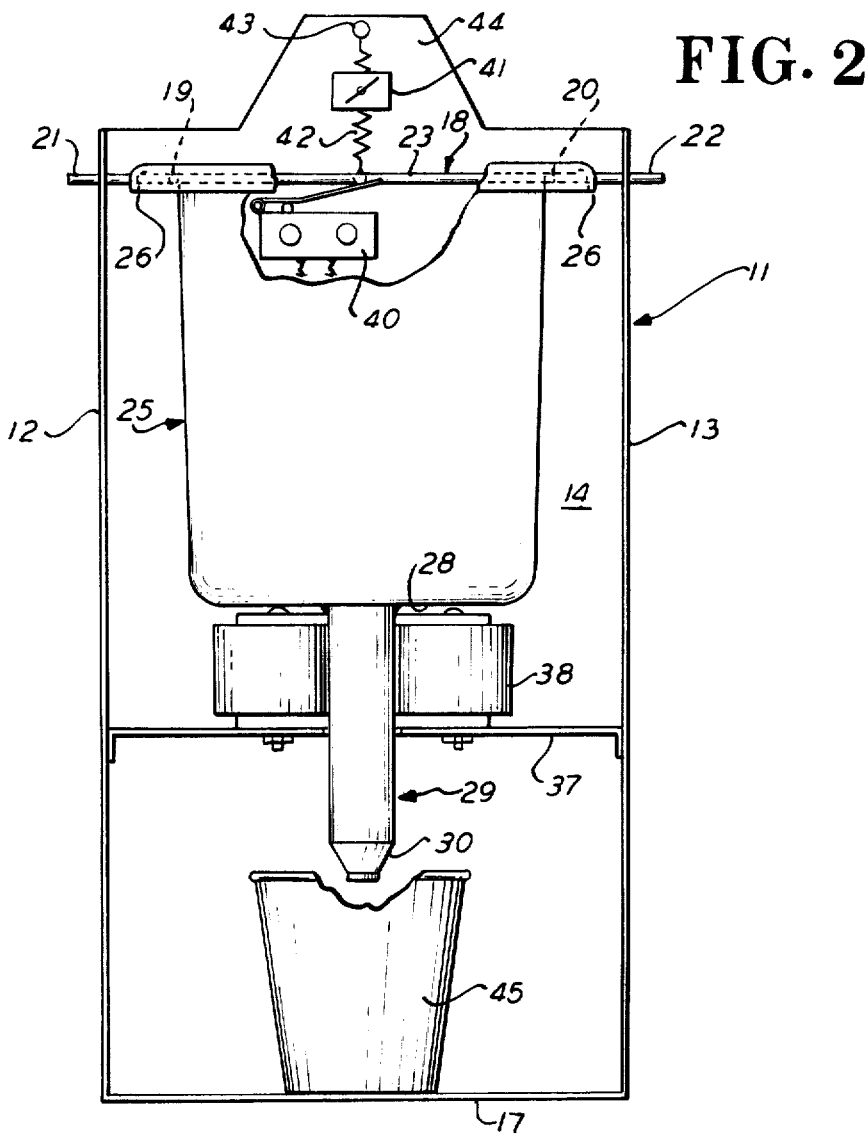
FIG. 2 is a front elevational view of the liquid dispenser illustrated in FIG. 1 with the front panel removed.
Figure 3:
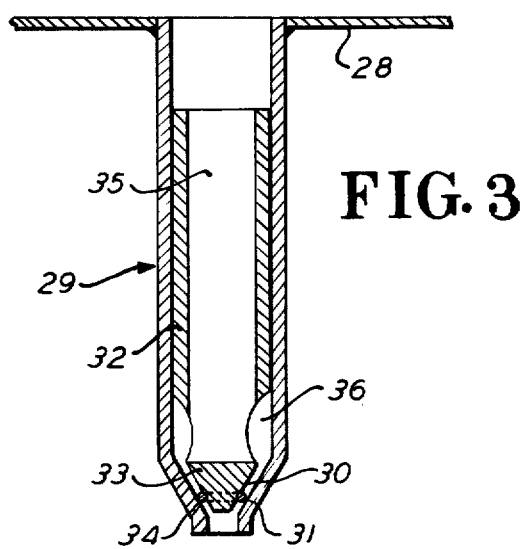
FIG. 3 is a end elevational cross-sectional view of the dispensing conduit depending from the bottom of the reservoir showing a magnetically operable valve core therein.
Figure 4:
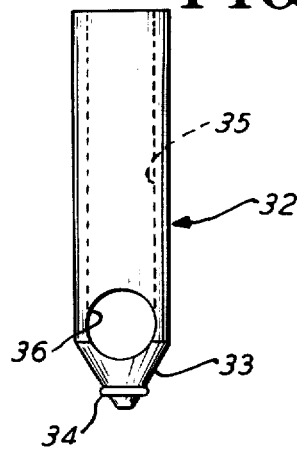
FIG. 4 is an end elevational view of the valve core shown in FIG. 3.

A generally U-shaped reservoir mounting bracket 18 is secured within the housing 11 near the top 16 thereof. The reservoir mounting bracket 18, shown in detail in FIG. 5 has a generally U-shaped configuration and consists of a pair of generally parallel, spaced apart side legs 19 and 20 having offsets 21 and 22 on their free ends. The side legs 19 and 20 are joined together by a cross leg 23 which supports a third offset 24.

The reservoir mounting bracket 18 is secured to the housing 11 by means of offsets 21 and 22 passing through holes in the side walls 12 and 13 respectively and the offset 24 passing through a hole in the rear wall 14.

A liquid reservoir 25 having a generally rectangular configuration and open at the top is mounted on the reservoir mounting bracket 18 by means of a peripheral flange 26 extending thereover. The width of the reservoir 25 is slightly less than the distance between the side legs 19 and 20 of the reservoir mounting bracket 18. The reservoir 25 is passed through the open end of the bracket 18 horizontally until the offsets 21, 22 and 24 seat within grooves 27 in the flange 26.

The bottom 28 of the reservoir 25 is provided with a depending conduit 29. The conduit 29 is provided with a tapered end 30 defining an internal valve seat 31.

A generally cylindrical valve core 32 is slidably mounted in the conduit 29. The core 32 is provided with a tapered end 33 which carries a sealing ring 34 adapted to engage the internal valve seat 31.

The valve core 32 is also provided with an internal axial passage 35 and a pair of opposed circular openings 36, 36 adjacent to the tapered end 33. The valve core is also fabricated of a ferromagnetic material which is influenceable by a magnetic field, functioning in the same fashion as a solenoid core.

The housing 11 is also provided with a generally horizontal floor 37 intermediate the top 16 and bottom 17. A generally U-shaped electrical coil 38 is mounted on the top of the floor 37. The coil 38 is open centrally preferably opposite the front panel 15 of the housing 11 and is dimensioned to receive the conduit 29 when the reservoir 25 is suitably seated on the reservoir mounting bracket 18.

An electrically operated heater 39 is also mounted on the top of the floor 37 immediately beneath the reservoir 25 for purposes of maintaining the temperature of the liquid therein. Additionally, offset 24 of the reservoir mounting bracket 18 is operatively connected to a micro-switch 40 for the purpose of rendering the coil 38 inoperative in the event that the reservoir 25 becomes depleted of liquid; the micro-switch 40 sensing the change of weight below a critical limit. Additionally, a spring-operated guage 41 may be operatively connected to the offset 24 for the purpose of a constant read-out on the amount of liquid in the reservoir 25. Such a guage 41 may employ a calibrated spring 42 which is mounted between the offset 24 and another pin 43 on a vertical extension 44 of the rear wall 14.

In operation, a coin-operated control mechanism which is neither shown nor described in detail but which is well known in the art is employed to energize the coil 38 for a predetermined period of time. When the coil 38 is energized, the valve core 32 is raised permitting the flow of fluid through the conduit 29 to a receiving cup 45 located beneath the intermediate floor 37. Preferably, the front panel 15 extends only from the top 16 of the housing 11 downwardly to the floor 37.

When the reservoir 25 is depleted, it may be removed together with the conduit 29 and valve core 32 as a unit by means of removing the front panel 15 and withdrawing the reservoir forwardly in a horizontal plane. The coil 38 is mechanically unconnected to the conduit 29 and therefore permits cleansing of the conduit, reservoir and valve core by immersion without danger of a damage to electrical windings or other electrical parts. Additionally, because the reservoir 25 is removed by a horizontal movement rather than a vertical movement, the head room necessary for the dispenser is that of the height of the housing 11.

It will be understood by those skilled in this art that many modifications and variations of the disclosed invention may be made without departing from the spirit and scope of the invention.

What is claimed is:

1. A liquid dispenser with horizontally separable, unitized liquid reservoir and valve assembly comprising,
   a. a liquid reservoir,
   b. a liquid discharge conduit depending from and communicating with the reservoir,
   c. valve means in the conduit, operable in response to the imposition of a magnetic field thereupon,
   d. magnetic field generating means positioned with respect to the conduit to impose a valve-operating magnetic field upon said valve means, the said magnetic field generating means being external to and detachable from said conduit and having an opening extending from the top to the bottom thereof sufficiently large to permit the passage of the conduit therethrough by movement in a horizontal plane, the said magnetic field generating means generating movement of the said valve means substantially only vertically in the said conduit,
   e. the reservoir and conduit being detachable from the magnetic field generating means by movement in a horizontal plane.

2. A liquid dispenser with horizontally separable, unitized liquid reservoir and valve assembly comprising,
   a. a structure in accordance with claim 1 and
   b. hollow housing,
   c. the reservoir detachably mounted in the housing, the reservoir being detachable from the housing by movement in a horizontal plane,
   d. the said conduit communicating with and depending from the bottom of the reservoir, the conduit being open at its bottom,
   e. an elongated valve core vertically slidably mounted in the conduit, the valve core being hollow, open at its top and closed at its bottom, the core also having at least one opening in its side communicating with its hollow center proximal to its bottom,
   f. cooperatively engagable valve seat means on the open bottom of the conduit and the closed bottom of the core, the core closing the bottom of the conduit under the influence of gravity,
   g. the core being responsive to said field to move substantially only vertically upwardly in the conduit thereby opening the bottom thereof to permit the passage of fluid downwardly from the reservoir through the hollow core, outwardly through the opening in the side of the core and downardly through the bottom of the conduit.

3. A liquid dispenser with horizontally separable, unitized liquid reservoir and valve assembly comprising,
   a. the structure in accordance with claim 1 and
   b. a hollow housing,
   c. a reservoir mounting bracket in the housing, the reservoir being detachably supported by the bracket.

4. A liquid dispenser with horizontally separable, unitized liquid reservoir and valve assembly comprising,
   a. the structure in accordance with claim 2 in which
   b. the magnetic generating means is an electrically energizable coil,
   c. the said coil having a generally U-shaped configuration, the conduit being movable horizontally into nesting but mechanically unattached relationship within the confines of the coil.

5. A liquid dispenser with horizontally separable, unitized liquid reservoir and valve assembly comprising,
   a. the structure in accordance with claim 2 and
   b. the hollow housing having spaced apart side walls, a rear wall and a front panel,
   c. reservoir mounting means in the housing,
   d. the said magnetic field generating means being mounted within the housing, the said magnetic field generating means having a generally U-shaped configuration, the conduit being in a horizontally nesting mechanically unattached relationship within the confines of the said magnetic field generating means,
   e. at least a portion of the housing being movable for ingress and egress of the reservoir and conduit by movement in a horizontal plane,
   f. means for controlling the temperature of the fluid in the reservoir,
   g. means for detecting the weight of the reservoir,
   h. display means operatively connected to the wieght detecting means and responsive to changes in weight of the reservoir.

* * * * *